United States Patent
Jäger

(10) Patent No.: US 6,669,612 B2
(45) Date of Patent: Dec. 30, 2003

(54) FINGER ROLLER FOR AGRICULTURAL MACHINES

(75) Inventor: Sebastian Jäger, Hannover (DE)

(73) Assignee: Artemis Kautschuk-und Kunststoff technik GmbH (DE)

( * ) Notice: Subject to any disclaimer, the term of this patent is extended or adjusted under 35 U.S.C. 154(b) by 0 days.

(21) Appl. No.: 09/768,668

(22) Filed: Jan. 23, 2001

(65) Prior Publication Data

US 2001/0009882 A1 Jul. 26, 2001

(30) Foreign Application Priority Data

Jan. 23, 2000 (DE) .................................... 200 00 985 U

(51) Int. Cl.$^7$ .............................................. A01B 29/00
(52) U.S. Cl. ............................. 492/30; 29/891; 172/544
(58) Field of Search ................................ 492/30, 33, 36; 172/523, 522, 534, 540, 550, 121, 543, 544, 545, 546, 551, 548, 539, 537, 531; 56/12.4, 12.5, 104; 241/103, 185.5, 193

(56) References Cited

U.S. PATENT DOCUMENTS

| | | | | | |
|---|---|---|---|---|---|
| 88,669 A | * | 4/1869 | Harrow et al. | ............... | 172/523 |
| 100,128 A | * | 2/1870 | Dunn | ........................ | 172/534 |
| 635,685 A | * | 11/1899 | Holloway | ................... | 172/534 |
| 907,278 A | * | 12/1908 | Patrick | ....................... | 172/534 |
| 1,174,538 A | * | 3/1916 | Askew | ........................ | 172/534 |
| 2,287,768 A | * | 6/1942 | Eckstein | ..................... | 101/475 |
| 2,436,214 A | * | 2/1948 | Johnson | ....................... | 452/93 |
| 2,561,761 A | * | 7/1951 | Tempe | ........................ | 492/36 |
| 2,729,027 A | * | 1/1956 | Slayter et al. | ................ | 65/536 |
| 2,822,837 A | * | 2/1958 | Clausen | ................... | 144/207.7 |
| 3,176,782 A | * | 4/1965 | Bezzerides | .................. | 172/534 |
| 3,477,093 A | * | 11/1969 | Zebarth et al. | ............... | 452/91 |
| 3,537,128 A | * | 11/1970 | Zebarth et al. | ............... | 452/93 |
| 3,597,906 A | * | 8/1971 | Bodine | ....................... | 56/13.3 |
| 3,597,910 A | * | 8/1971 | Stewart | ...................... | 56/400 |
| 3,737,199 A | * | 6/1973 | Stephenson | ................. | 172/123 |
| 4,335,570 A | * | 6/1982 | Fitzmaurice | ............... | 56/327.1 |
| 4,368,764 A | * | 1/1983 | Peterson et al. | ......... | 144/208.7 |
| 4,469,185 A | * | 9/1984 | Fox et al. | ................... | 172/540 |
| 4,599,029 A | * | 7/1986 | Zyduck | ........................ | 414/297 |
| 4,927,440 A | * | 5/1990 | Butler et al. | ................. | 56/12.8 |
| 5,188,500 A | * | 2/1993 | Eide et al. | ................... | 414/412 |
| 5,588,382 A | * | 12/1996 | Embree et al. | ............. | 111/139 |
| 6,135,567 A | * | 10/2000 | Cochran | ..................... | 172/540 |
| 6,345,671 B1 | * | 2/2002 | Siemens et al. | ............ | 111/139 |

* cited by examiner

*Primary Examiner*—Gregory Vindovich
*Assistant Examiner*—Marc Jimenez
(74) *Attorney, Agent, or Firm*—R W Becker & Associates; R W Becker

(57) ABSTRACT

A finger roller for agricultural machines is provided. At least one finger disk is disposed on a shaft of the finger roller and has a hub, over the periphery of which are distributed and project a plurality of fingers. The fingers are at least slightly elastically deformable, and a side of each finger that faces in the direction of rotation of the finger roller is markedly roughened, for example by being provided with fine ribs, studs or knobs.

7 Claims, 1 Drawing Sheet

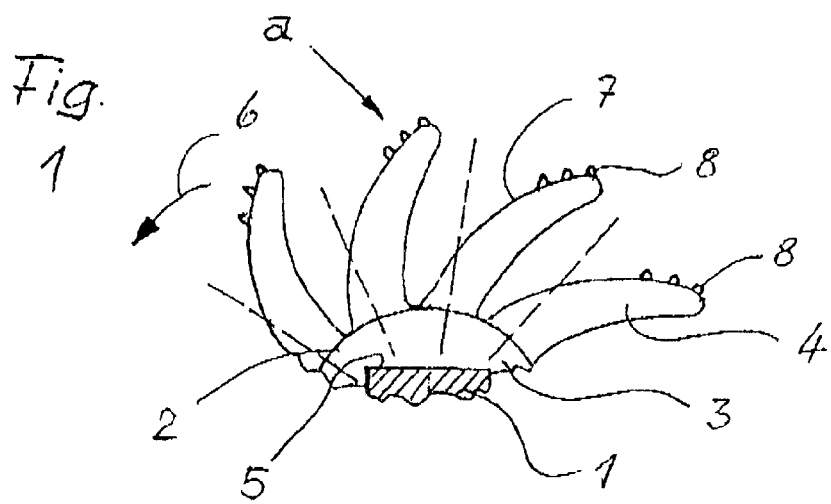
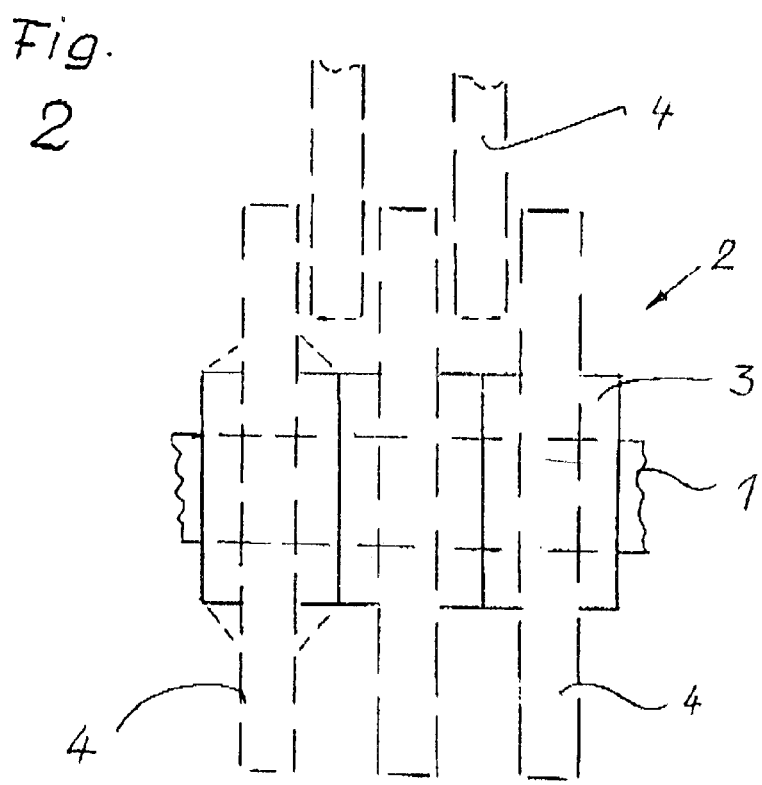
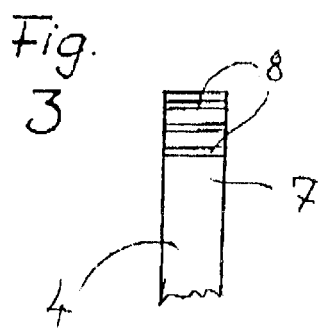
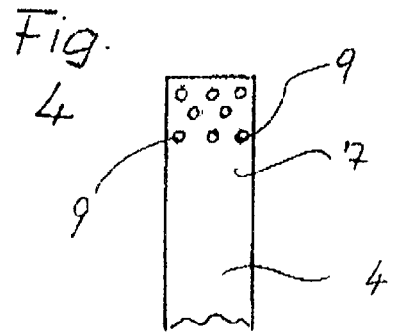

FINGER ROLLER FOR AGRICULTURAL MACHINES

BACKGROUND OF THE INVENTION

The present invention relates to a finger roller for agricultural machines, with the roller having a plurality of projecting, at least slightly elastically deformable fingers distributed over the hub of the roller, whereby the fingers can be disposed on a plurality of finger disks that are placed on the shaft of the roller.

Rollers of this type are used, for example, with turnip and potato diggers, stone or rock collectors, and vegetable harvesting machines, with the general objective of such rollers being to clean the collected material or harvested vegetables, to sort them, to sift them, and to remove any earth from the material.

It is an object of the present invention to improve the aforementioned roller, and in particular the fingers thereof, in such a way as to significantly improve their cleaning effect.

BRIEF DESCRIPTION OF THE DRAWING

This object, and other objects and advantages of the present invention, will appear more clearly from the following specification in conjunction with the accompanying schematic drawing, in which:

FIG. 1 is a partial cross-sectional view through one exemplary embodiment of an inventive finger roller for agricultural machines;

FIG. 2 is a partial view of a finger roller with the finger disks being indicated, and also with the fingers of a counter roller being indicated; and FIGS. 3 and 4 each show the front portion of a finger for a roller of the types shown in FIGS. 1 and 2, with the views being taken in the direction of the arrow "a" of FIG. 1.

SUMMARY OF THE INVENTION

The finger roller of the present invention is characterized primarily in that at least the front surface of the fingers, namely that face that faces in the direction of rotation of the roller, and in particular the ends of the fingers, are markedly roughened, and in particular, however, are provided with fine knobs, studs, ribs, or the like. Ribs are preferably utilized that extend approximately parallel to one another and in the axial direction of the roller.

Embodying the fingers in such a manner has the advantage that an additional cleaning effect occurs. An initial influence is thereby effected by the action of the fingers, while the aforementioned inventive finger configuration to a certain extent has a grating effect yet also gently acts upon the collected material. It is to be understood that the inventive embodiments are particularly suitable for crops.

Further specific features of the present invention will be described in detail subsequently.

DESCRIPTION OF PREFERRED EMBODIMENTS

Referring now to the drawing in detail, the finger roller illustrated in FIG. 1 essentially comprises a rotatably mounted, driven shaft 1, on which are arranged finger disks 2 that are non-rotatably mounted on the shaft. Each finger disk 2 has a hub 3 on which are disposed fingers 4 that are distributed over the periphery of the hub. The shaft 1 is embodied as a square or four-cornered shaft; in conformity therewith, the hub 3 has a correspondingly shaped opening 5.

The finger disks 2 are preferably embodied as injection molded articles, and in particular utilizing a polymer, for example on a rubber, polyurethane, elastomer or thermoplastic base, and in particular in such a way that at least the projecting fingers 4 are slightly elastically deformable and can be deflected counter to the direction of rotation 6 of the finger roller under the effect of the material that is to be handled.

Although in the illustrated embodiment the fingers 4 are curved toward the rear in order to promote a deflection counter to the direction of rotation 6, it is to be understood that other positions, for example a radial position, of the fingers 4 are also possible.

On that side 7 facing forward relative to the direction of rotation 6, the fingers 4 are provided with ribs 8 that extend parallel to one another and in the axial direction of the roller (see FIG. 3). The height of the ribs 8 is several times less than the thickness of the adjoining portion of the finger 4. These ribs 8, which extend over the width of the fingers, are molded on yet do not affect the deformability of the fingers 4; however, the ribs 8 result in an additional cleaning effect.

Instead of the ribs 8 illustrated in FIG. 3, it would also be possible to provide stud or knob like projections 9 that are arranged in rows, as illustrated in FIG. 4. Similarly, it would also be possible to roughen the entire surface that forms the side 7, or to provide this surface with a plurality of small, possibly irregularly arranged elevations or recesses.

The specification incorporates by reference the disclosure of German priority document 200 00 985.0 of Jan. 23, 2000.

The present invention is, of course, in no way restricted to the specific disclosure of the specification and drawing, but also encompasses any modifications within the scope of the appended claims.

What I claim is:

1. A finger roller for agricultural machines, comprising:
   a shaft;
   at least one finger disk that is disposed on said shaft and has a hub; and
   a plurality of fingers distributed over and projecting from a periphery of said hub, said fingers and said hub forming an integrally formed injection molded unit, wherein said fingers are at least slightly elastically deformable, wherein a side of each of said fingers that faces in a direction of rotation of said finger roller is markedly roughened, wherein said fingers are deflectable counter to a direction of rotation of said finger roller, and wherein said roughened side of said fingers is produced by fine ribs, studs, or knobs.

2. A finger roller according to claim 1, wherein said roughened side of each finger is provided in the vicinity of a free end of said finger.

3. A finger roller according to claim 1, wherein a height of elements that form said roughened side of each finger is several times smaller than a thickness of an adjacent portion of said finger.

4. A finger roller according to claim 1, wherein said roughened side of each finger is produced by ribs that extend at least essentially in an axial direction of said roller.

5. A finger roller according to claim 4, wherein said ribs also extend over a width of said finger.

6. A finger disk suitable for mounting on a shaft to help form the finger roller of claim 1, wherein said finger disk is provided with roughened portions.

7. A finger roller for agricultural machines, comprising:
a shaft; and
at least one finger disk having a hub and a plurality of fingers, said fingers and said hub forming an integrally formed injection molded unit comprising an elastomeric material which extends in a continuous manner to and between said hub and said fingers, said hub having a central opening for receiving said shaft therethrough such that said at least one finger disk is disposed on said shaft with said shaft and said hub being co-axial with one another; and
said plurality of fingers being distributed over and projecting from a periphery of said hub, said fingers being at least slightly elastically deformable and including a plurality of projections on a side of each of said fingers that faces in a direction of rotation of said finger roller, the projections on each respective finger projecting outwardly in the direction of rotation relative to the balance of the side of the respective finger such that the projections are the forwardmost surfaces of the side of the respective finger as viewed in the direction of rotation, and said fingers being resiliently deflectable counter to the direction of rotation of said finger roller and, due to the continuously extending elastomeric material extending to and between said fingers and said hub, said hub being resiliently deformable upon deflection of said fingers beyond a threshold degree of deflection.

* * * * *